Fig. 1

INVENTORS.
Elsmere W. McKinney
Joseph D. Kreis
BY
George V. Woodling
ATTORNEY.

Fig. 2.

Patented Dec. 5, 1939

2,182,401

UNITED STATES PATENT OFFICE 2,182,401

FLUID ACTUATED ROLLED FORMING MACHINE

Joseph D. Kreis and Elsmere W. McKinney, Cleveland, Ohio, assignors to The McKinney Tool and Manufacturing Company, Cleveland, Ohio, a corporation of Ohio Application April 13, 1936, Serial No. 74,150

15 Claims. (Cl. 153—9)

Our invention relates to rolling and beading machines and more especially to rolling and beading machines for rolling the bead in a vessel or tub.

An object of our invention is to provide a machine for rolling the bead or otherwise forming the edge of a vessel or tub.

Another object is to provide means for applying hydraulic pressure to a vessel to be shaped and for rotating the vessel as it is being shaped.

Another object is to provide a reciprocating tooling member adapted to engage the vessel against a mating tooling member mounted to a stationary support.

A still further object is to provide a reciprocating tooling member adapted to move forward rapidly toward the vessel to be shaped and then to move forward relatively slowly while pressure is applied to said vessel, and to move back into inoperative position at a rapid rate after the vessel is formed.

Another object is to provide a holding member for holding the vessel while it is being formed, the operation of the holding member being responsive to the movement of the reciprocating tooling member.

A still further object is to provide work guide members for guiding the vessel to be formed, the operation of the work guiding members being responsive to the movement of the holding member and to the movement of the reciprocating tooling member.

Other objects and a fuller understanding may be had by referring to the following description and claims, taken in conjunction with the accompanying drawings, in which:

Referring to our figures, our invention includes a frame 20, a stationary member 23, a platform 85, a reciprocating member 24, a cam assembly 118, a valve assembly 190, a motor 27, rotating tooling members 39 and 49, and a piston 58 for actuating the reciprocating member 24.

Figure 1:
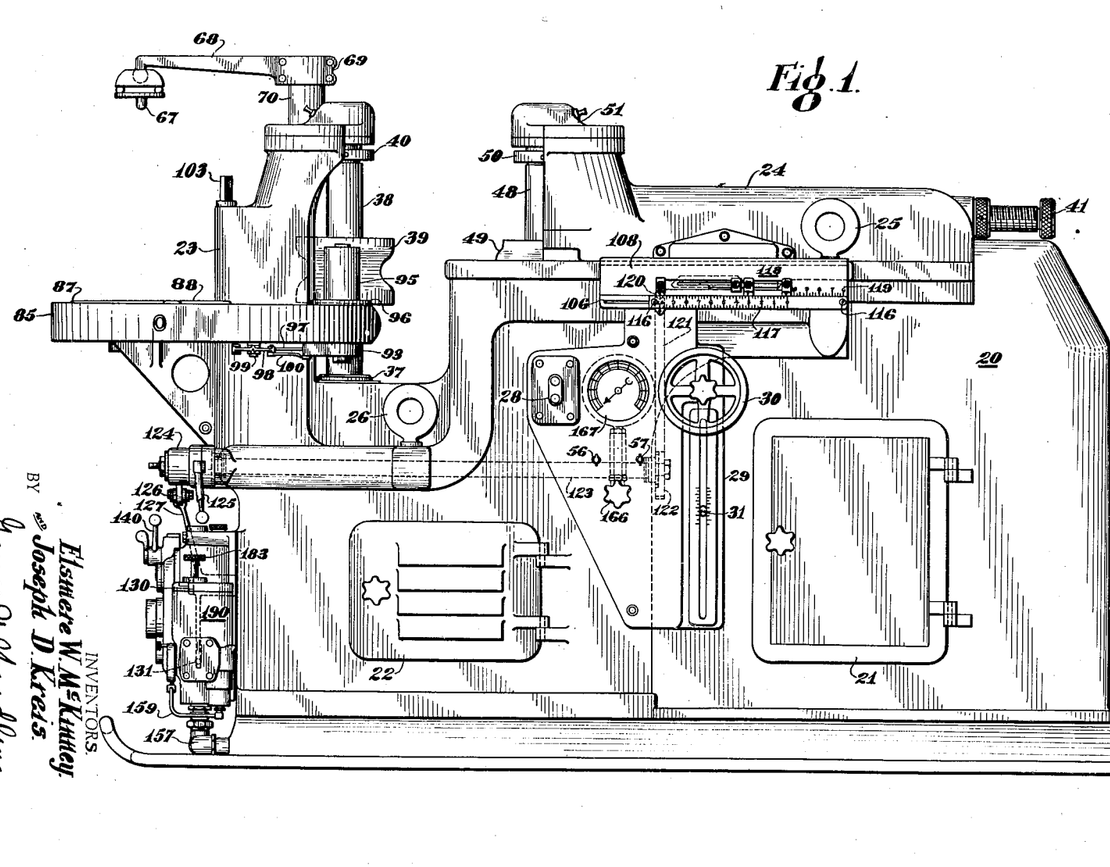
Figure 1 is a side view of my machine.

In reference to Figure 1, we provide the frame 20 with two doors 21 and 22 for access to the inner mechanism. The lift hooks 25 and 26 are suitably mounted upon the frame 20 for placement of the frame 20. The stationary member 23 carries the tooling member 39 while the reciprocating member 24 carries the tooling member 49.

Figure 2:
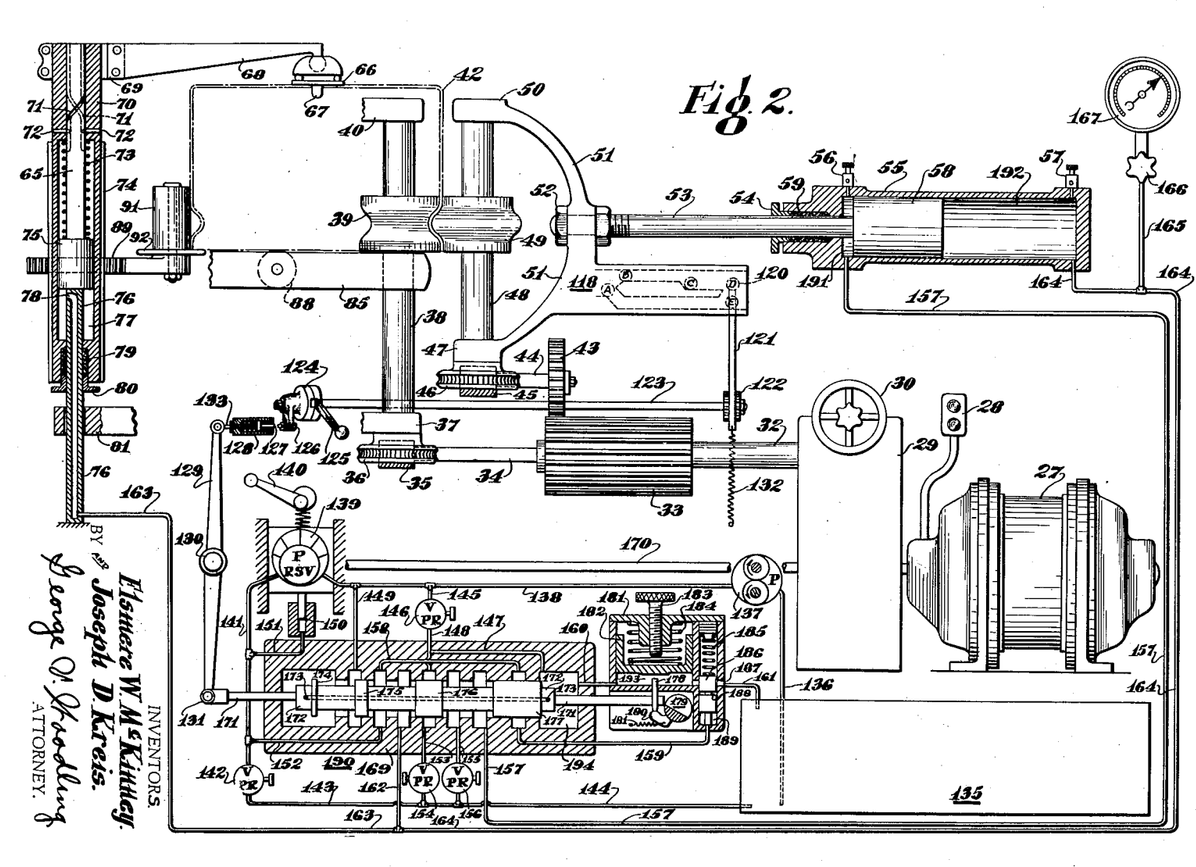
Figure 2 is a diagrammatical view of my machine showing the operative parts and their co-relationship.

The nature of our invention is better understood by referring to the diagrammatical showing of Figure 2. The electric motor 27, controlled by the switch 28, drives the variable speed transmission 29, which is controlled by the turning of the handle 30. The power of the motor 27 through the variable speed transmission 29 drives the shaft 32, the elongated gear 33, the extension shaft 34, and the worm gear 35. The regulation of the variable speed transmission 29 is indicated on the outside of the frame 20 by the indicator 31. The rotation of the worm gear 35 rotates the gear 36, which in turn rotates the shaft 38. The shaft 38 is carried by the bearing members 37 and 40, which bearing members are mounted upon the stationary member 23 (see Figure 1). Non-rotatively mounted upon the shaft 38 at the desired elevation is the female tooling member 39 which rotates as the shaft 38 rotates.

The gear 43 is engaged in the elongated gear 33 so as to rotate with that gear. The gear 43 rotates the shaft 44 and the worm gear 45, thus rotating the gear 46 enmeshed with the worm gear 45. The rotation of the gear 46 turns the shaft 48 and the male tooling member 49 which is non-rotatively mounted thereon, so that the rotation of the gear 46 turns the tooling member 49. The vessel or tub 42 is shown in forming position between the rotating tooling members 39 and 49.

The shaft 48 is carried by the bearing members 47 and 50.

The supporting arm 51 supports the bearing members 47 and 50 which carry the shaft 48 and the tooling member 49. The reciprocating member 24 shown in Figure 1 is mounted upon and carried by the supporting arm 51 shown in Figure 2. The nut 52 secures the supporting arm 51 to the piston stem 53 of the piston 58. The piston 58 is enclosed within the piston chamber 55, with the piston stem 53 extending therefrom, through the packing 59 and the packing ring 54. The air valves 56 and 57 upon the piston chamber 55 permits air caught in the piston chamber to be drawn off. It is readily seen that movement of the piston 58 within the piston chamber 55 causes the supporting arm 51 to reciprocate the tooling member 49 back and forth, as the position of the piston within the piston chamber 55 is changed. It is also seen that the gear 43 is enmeshed with the elongated gear 33 at all times during the reciprocating movement.

The cam assembly 118 is mounted upon the lower part of the supporting arm 51 and extends back parallel to the piston stem 53. The cam roller 120 rotatively mounted upon the end of the connecting rod 121 is so mounted as to ride along the contour of the cam assembly 118. Figure 2 shows in dotted lines, the contour of the cam assembly which the cam roller 120 follows. It is seen that the whole cam assembly 118 is reciprocated with the supporting arm 51 so that the position of the cam roller 120 is accordingly changed, as it rides up and down over the irregular contour of the cam assembly outline. This movement of the cam roller 120 is translated to the connecting rod 121 so that the vertical movement of the connecting rod 121 is responsive to the horizontal movement of the cam assembly 118.

Figure 4:
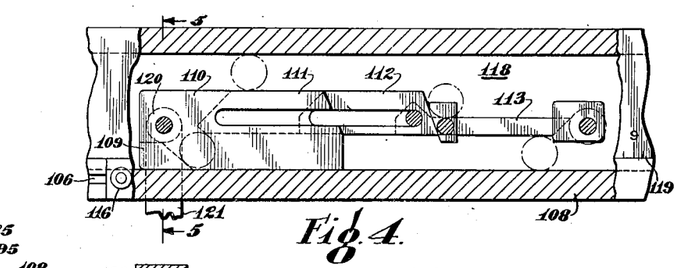
Figure 4 shows in detail the mounting of the parts of the cam assembly.
Figures 5, 6, 7:
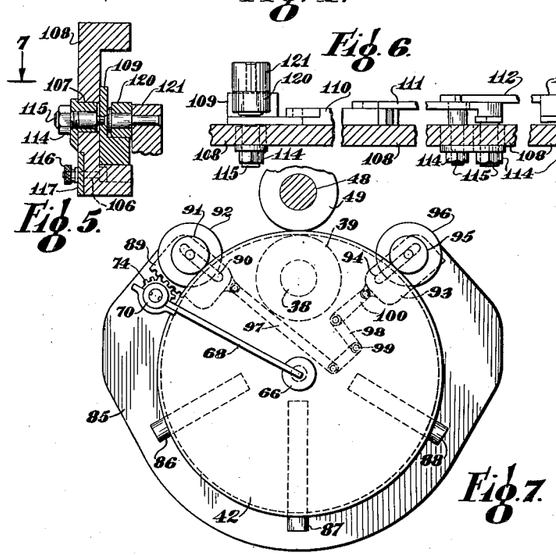
Figure 5 is a view taken through the line 5—5 of Figure 4.
Figure 6 is a fragmentary showing of a view looking down on the illustration of Figure 4.
Figure 7 is a view taken along the line 7—7 of Figure 3.

Figures 4, 5, and 6 illustrate in detail the assembly of the cam assembly 118 and show that it is made up of a plurality of plates or members 109, 110, 111, 112, and 113. These members are all mounted upon the back plate 108 by means of the bolts 115 and the nuts 114, passing through the elongated slot 107 in plate 108. This assembly of members provides an irregular contour upon which the cam roller 120 rides, thus carrying the connecting rod 121 with it. The contour may be changed so as to obtain different movement of the cam roller 120 by mounting the respective members 109, 110, 111, 112, 113 into different relative positions along the slot 107 in the back plate 108. The graduated scale 119 is connected to the back plate 108, so that the whole cam assembly may be accurately set with relationship with the scale 117 shown in Figures 1 and 5.

Figure 5 is a cross-section taken through the line 5—5 of Figure 4 and shows the cam roller 120 riding upon the member 109. The set screw 116 in the elongated slot 106 clamps the scale 117 to plate 108 in the desired position.

Figure 6 is a view looking down upon the views shown in Figure 4, and shows the same parts as in Figure 4 with portions cut away.

In reference again to Figure 2, the connecting rod 121 is restrained downwardly by the spring 132 anchored to the frame. The connecting rod 121 has teeth so as to form a rack which is enmeshed with the pinion 122. The rotation of the pinion 122 by reason of the racking movement of the connecting rod 121 rotates the control member 124. In the event of an emergency, the control member 124 may be de-clutched by throwing the handle 125 to the left, and the valve assembly 190 may be manually operated by moving the handle 125 up and down. Extending radially from the control member 124 is the arm 126, which is moved by the rotation of the shaft 123. The rod 127 is pivotally connected to the arm 126, and the rod 133 is pivotally connected to the lever arm 129. Mounted upon the rods 127 and 133 and intermediate thereof is a spring assembly 128, which acts as a shock absorber for any sudden or violent movement of rod 127 and rod 133 relative to each other. The same movements between the relative parts is obtained, but all jerking and sudden action is eliminated by the resiliency of the spring assembly 128.

The lever arm 129 is pivotally mounted to the frame by the pivotal connection 130 and has its lower end pivotally connected at 131 to the piston stem 171. The piston stem 171 extends into and through the piston chamber 169 so as to reciprocate the piston 172 within the piston chamber 169. Mounted upon the piston 172 and relatively spaced to each other are the large portions or flanges 174, 175, 176 and 177. Movement of the piston 172 changes the relative position of these flanges 174, 175, 176 and 177 in respect to the plurality of ports in the piston chamber 169, thus operating the valve assembly known generally by the reference character 190.

It is seen by referring to all the drawings, particularly the diagrammatical drawing of Figure 2, that the reciprocation of the reciprocating member 24 on the supporting arm 51 causes a movement of the cam roller 120 which is translated through the connecting rod 121 to the shaft 123 and then through the control member 124 to the lever arm 129, and to the piston 172, thus controlling the operation of the valve assembly 190.

The tub 42 is held down in position while being formed by the holder 66 which has a projection 67 adapted to be inserted into a hole in the center of the tub 42. A holder arm 68 supports the holder 66 and is mounted to the cylinder 70 by the bracket fastening 69. A supporting rod 65 is mounted within the center opening of the cylinder 70 and has its bottom end mounted to the piston 75. There are two spiral grooves 71 in the peripheral portion of the supporting rod 65 in which the pins 72 are slidably engaged. Relative movement between the cylinder 70 and the supporting rod 65 causes a rotary movement between the cylinder 70 and the supporting rod 65 by reason of the action of the pins 72 in the spiral grooves 71. An expansive coil spring 73 within the cylinder 70 around the supporting shaft 65 by pressing against the shoulder within the cylinder 70 and the piston 75 tends to push the cylinder 70 and the holding arm 68 in an upward direction. The piston 75 is permanently mounted to the piston stem 76 which protrudes out of the cylinder 70 through the packing 79 and the packing ring 80. The arm 81 protruding from the frame 20 securely holds the piston stem 76 in a permanent position. An elongated gear or pinion 74 mounted on the cylinder 70 is enmeshed with the rack member 89 so that rotation of the cylinder 70 and the gear or pinion 74 causes a horizontal movement of the rack member 89.

The filling of the chamber 77 within the cylinder 70 by introducing fluid through the opening 78 in the piston stem 76 will force the cylinder 70 downwardly as the piston 75 is permanently positioned by reason of the mounting of the piston stem 76 on the arm 81. The pressure of the fluid in the chamber 77 tends to counteract the action of the coil spring 73 and thus to pull the cylinder 70, and the holder arm 68 downwardly and to turn the arm 68 by the action of the pins 72 in the grooves 71.

Figure 3:
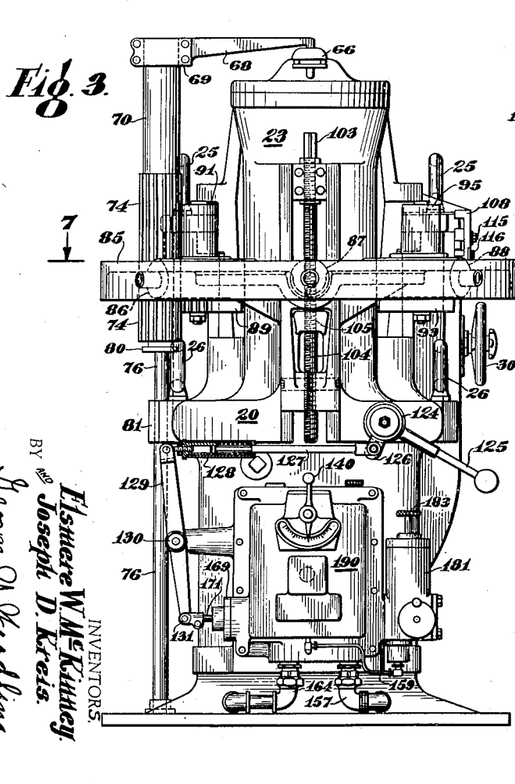
Figure 3 is a left hand view of the illustration shown in Figure 1.

The illustration in Figure 2 being diagrammatical does not show the guide members 91 and 95 in proper position on the platform 85 as they are located on the inner end of the platform as shown in Figures 1, 3, and 7. The diagrammatical illustration of Figure 2 is to demonstrate the inter-relationship of the guide roller 91 and the cylinder 70 of the holding member 68. Figure 7, being a view taken along the line 7—7 of Figure 3, illustrates the position and operation of the parts mounted on the platform 85. The vessel 42 rests upon the rollers 86, 87, and 88 in such a way that the rolling action of the rollers facilitates the easy rotation of the tub 42 between the rotating tooling members 39 and 49. To properly guide the tub 42 while it is being formed, we provide the guide rollers 91 and 95 mounted upon the reciprocating members 89 and 93 respectively. The bottom of each guide roller 91 and 95 is flanged out to form the flange portions 92 and 96 respectively, upon which flange portions the tub 42 rides as it is gauged by the guide rollers 91 and 95. The reciprocating member 89 has an elongated slot 90 and the reciprocating member 93 has an elongated slot 94, in which slots ride respective pins mounted to the platform 85 so that the reciprocating member 89 and 93 are reciprocatedly mounted to the platform 85. One side of the reciprocating member 90 has teeth to form a rack, which rack is engaged with the teeth of the elongated gear or pinion 74 around the cylinder 70, which supports the holding arm 68 and holding member 66. Therefore, rotation of the elongated gear 74 causes a reciprocating movement of the reciprocating member 89. A long rod 97 extends inwardly from the reciprocating member 89 and a short arm 100 extends inwardly from the reciprocating member 93. These arms 97 and 100 are joined at their inner ends by pivotal mounting to the end of the arms of the bell crank 98, which bell crank 98 is pivotally mounted by the pivotal mounting 99 to the platform 85. The relation of the parts is such that a reciprocating movement of the reciprocating member 89 is translated by the arms and the bell crank 98 to the reciprocating member 93 so as to move the reciprocating member 93 inwardly to the same extent that reciprocating member 89 is moved inwardly, and to move the reciprocating member 93 outwardly to the same extent that the reciprocating member 90 is moved outwardly. Therefore, inward and outward movement of the guide roller 91 is duplicated by movement of the guide roller 95. In this way, the tub 42 is properly held in forming position and guided by the guide rollers or guide members 91 and 95.

Figure 3 illustrates the manner in which the platform 85 may be adapted for different uses by raising and lowering the platform 85 relative to the frame 20. A long threaded rod 104 extends down through the end of the frame 20 and stationary member 23 and is threadably engaged in the threaded hole 105 in the platform 85. The platform 85 is lowered or raised relative to the frame 20 by the turning of the threaded rod 104 by means of a wrench or crank upon the squared end 103 of the threaded rod 104. The thread of the threaded rod 104 engaging the threads of the threaded hole 105 in the platform 85 acts to jack the platform up and down upon the frame 20.

Referring to Figure 2, to operate the piston 58 in the piston chamber 55 and to operate the piston 75 in the cylinder 70, we provide a fluid system, the fluid in the system being driven by a gear pump 137 and a rotary sliding vane pump 139. The pumps 137 and 139 are driven by the motor 27 through the shaft 170. The operation of the fluid system and its control are described in the following manner:

Beginning with the cam roller 120 in position C upon the cam assembly 118, the machine is ready to proceed at a feed forward operation, that is, the piston 58 is to apply a thousand pounds pressure upon the tub being formed between the tooling members 39 and 49.

The cam roller 120 moves from position C to D during the initial step of the feed forward operation. In order to continue the operation while the entire circumference of the tub is pressed, it is necessary to keep the cam roller 120 on level C—D until the tub is fully formed. The cam roller is held up and restrained from falling into position E by the action of the delaying mechanism 181 until the proper period of time has elapsed. The feed forward operation continues while the cam roller 120 is on the level C—D. While moving from position C to position D and while on that level, the cam roller 120 so controls the movement of the piston 172 and the piston stem 171 in the piston chamber 169 of the control valve assembly 190 that the respective ports in the piston chamber 169 are opened and closed in such a manner that the fluid in the fluid system pursues the following course.

The fluid in the sump 135 is pumped up the pipe 136 by the gear pump 137, through the pipe 138 to the rotary sliding vane pump 139 where it is put under the required pressure and controlled by the operation of the volume control 140, which by changing the centrifugal center pump 139 obtains the desired pressure action. From there the fluid goes through pipe 141, pipe 152, to within the piston chamber 169 and out through the pipe 162. The fluid in pipe 162 divides so that part of its goes through the pipe 164 and is delivered to the rearward chamber 192 within the piston chamber 55, and thus drives the piston 58 forward by reason of the pressure of the fluid. Another part of the fluid in the pipe 162 is diverted through pipe 163 up through the opening 78 in the piston stem 76 into the chamber 77 of the cylinder 70. The pressure of the fluid in the chamber 77 presses the cylinder 70 downwardly and overcomes the action of the coil spring 73 so as to bring the holder arm 68 downward, and to swing it into position over the tub 42 by reason of the action of the pins 72 in the spiral grooves 71. The thousand pounds pressure built up in the rearward chamber 192 within the chamber 55, by the pump action of the pump 139, presses the piston 58 forwardly, within the piston chamber 55 and so presses and forms the tub 42 between the rotating tooling members 39 and 49. The fluid already in the forward chamber 191 of the piston chamber 55 is pressed out by reason of the forward action of the piston 58 and the fluid in the forward chamber 191 flows out pipe 157 back into the interior of the valve assembly 190, and then out again through the pipe 155 and the pressure relief valve 156, which pressure relief valve 156 is set at 100 pounds, and then out through the pipe 144 back into the sump 135.

As the piston 58 presses forward within the piston chamber 55, the pressure in the rearward chamber 192 builds up to a thousand pound pressure due to the resistance of the tub 42. However, the pressure does not exceed 1000 pounds because of the releasing action of the pressure release valve 142, which when overcome by any excess pressure drains off fluid to reduce the pressure to 1000 pounds through the outlet pipes 143 and 144 back in the sump 135. At the same time that the fluid is being pumped into the rearward chamber 192, of the piston chamber 55, the fluid of the pump 139 is also being pumped through another course which is as follows: The fluid from the pump 139 goes through the pipe 141 through pipe 152 within the valve assembly 190 out through the left hand port of the pipe 158 and in again through the right hand port of the pipe 158 to within the valve assembly 190, and out through the pipe 159, and up into the small chamber 189 within the delaying mechanism 181. The pressure of this fluid within the small chamber 189 forces the small piston 186 upwardly so as to counteract the spring tension of the coil spring 185, to a position that the opening 188 coincides with the opening 187. The registering of the opening 188 in the piston 186 with the opening 187 permits the fluid in the chamber 193 of the delaying mechanism 181 to flow therefrom through the registered openings out through the pipe 161, and down into the sump 135. By reason of the smallness of the openings 187 and 188, only a limited amount of fluid may escape through the pipe 161, and thus a predetermined amount of time is consumed in draining the chamber 193. As the capacity of the chamber 193 may be adjusted by the turning of the set screw 183, the time of the delaying action of the whole delaying mechanism 181 may be predetermined.

It is to be noted that the cam roller 120 would tend to move down from position D to position E, thus moving the connecting rod 121 downwardly and to move the piston stem 171 to the extreme right. However, as shown in Figure 2, this movement to the right of the piston stem 171 is locked by the position of the cam member 179. This blocking of the movement to the right of the piston stem 171 holds the cam roller 120 up into position D instead of allowing it to fall down into position E. As the fluid in the chamber 193 is slowly drained out through the pipe 161, the pressure of the fluid against the coil spring 184 is diminished so that the coil spring presses the cup-shaped piston 182 downwardly, within the delaying mechanism 181. Upon the draining of the fluid within the chamber 193, the piston 182 presses down upon the pin 178 which pin in turn presses against the finger member 180 to overcome the tension of the small spring 181. The downward movement of the finger member 180 causes the cam member 179 to rotate a partial turn, thus permitting the piston stem 171 to move in a direction to the right.

The rightward movement of the piston stem 171 brings the cam roller 120 down into position E where the rapid traverse reverse operation is instituted. In the rapid traverse reverse operation, the piston 58 is moved back rapidly within the piston chamber 55 so as to withdraw the tooling member 49 away from the tub 42 at a relatively fast rate of speed. The course of the fluid in the fluid system during the rapid traverse reverse operation, that is when the cam member 120 goes from position E to position A, is as follows: The fluid is pumped by the pump 137 through the pipe 138, part of which fluid flows through the pipe 145 and the pressure relief valve 146, which pressure relief valve is set at 300 pounds pressure, thence to within the valve assembly 190, out through the pipe 153 and the pressure relief valve 154, which pressure relief valve is set at 10 pounds pressure, out through the outlet pipe 144 and back into the sump 135. Other parts of the fluid pumped by the pump 137 through the pipe 138 flows through the pipe 149 to within the valve assembly and out again through the pipe 147 which pipe carries the fluid up into the forward chamber 191 within the piston chamber 55, thus forcing the piston 58 back through the piston chamber 55 at a relatively rapid rate of speed. Another portion of the fluid pumped by the pump 137 through the pipe 138 is carried to the pump 139, from whence it flows through the pipe 141 and the pipe 152 to within the valve assembly 190 where it is by-passed to the other end of the valve assembly by the pipe 158 and then flows through the pump 157 and then up into the forward chamber 191 and also presses the piston 58 backwardly through the piston chamber at a relatively rapid rate of speed.

As the piston 58 is moved backwardly in the piston chamber 55, the fluid in the rearward chamber 192 is drained out through pipe 164, up through pipe 162, to within the valve assembly 190, outwardly through the pipe 153 and the pressure relief valve 154, which pressure relief valve is set at 10 pounds pressure, and then through the outlet pipe 144 back into the sump 135.

At the same time that rearward chamber 192 is being drained, the fluid within the chamber 77 of the cylinder 70 is drained out through the pipe 163, up through the pipe 162, to within the valve assembly 190, thence outwardly through the pipe 153, and the pressure relief valve 154, which pressure relief valve is set at 10 pounds pressure, and out through the outlet pipe 144 back into the sump 135. The action of the coil spring 73 within the cylinder 70 raises the holder arm 68 and swings it around by the action of the pins 72 within the spiral grooves 71. The turning of the cylinder 70 and the elongated gear 74 causes the guide rollers 91 and 95 to move outwardly upon the platform 85 away from the tub 42.

After the completion of the above described circuit of the fluid and movement of the members, the cam roller 120 has moved to position A which is a neutral position. When in this neutral position, the fluid pumped by the pump 137 is carried in the following manner: Part of the fluid from the pump 137 is carried through the pipe 138, through the pump 139, through the pipe 141, through the pipe 152, to within the valve assembly 190, then out through the pipe 153, through the pressure relief valve 154, which pressure relief valve 154 is set at 10 pounds pressure, and outwardly through the outlet pipe 144 back in the sump 135. Another portion of the fluid is carried through the pipe 138, down through the pipe 149 to within the valve assembly 190, from whence it is carried through a longitudinal hole 173 extending through the piston 172 up to the right hand end of the valve assembly to the right hand end chamber 194, thence through the pipe 147 and the pipe 148 back to within the valve assembly 190, thence out again through the pipe 153, and the pressure relief valve 154, thence out through the outlet pipe 144, back into the sump 135. The fluid within the pipe 157 is trapped through the valve assembly and the pressure relief valve 156 and the fluid in pipe 164 is trapped through pipe 162, the valve assembly 190, and the pressure relief valve 154.

As stated, it is while in this position that fluid flows through the longitudinal hole 173 in the piston 172 out into the right hand end chamber 194. A portion of this fluid in the fluid chamber 194 flows through the pipe 160 and fills up the chamber 193 of the delaying mechanism 181. This fluid in the chamber 193 raises the cup-shaped piston 182 up against the spring 184 and again permits the pin 178 to push upwardly by reason of the movement of the finger 180 upon its bottom end. The tension of the spring 181 turns the cam member 179 up into position for blocking the rightward movement of the piston stem 171. In this way, the delaying mechanism 181 is again set ready for the next feed forward operation.

The next successive operation is the rapid traverse forward of the piston 58 so as to bring the tooling member 49 up to the tub 42 at a relatively rapid rate of speed so that little time is consumed in bringing the tooling members into position preparatory for the application of pressure upon the tub being formed. The rapid traverse forward operation is instituted by raising the lever 125 upward so as to raise the cam roller 120 from position A to position B, and so that it is ready to ride the upper contour of the cam assembly 118. However, prior to the raising of the handle 125, the tub 42 is placed in proper position for rolling upon the platform 85, ready for forming.

The course of the fluid during the rapid traverse forward operation is as follows: The fluid pumped by the pump 137 is carried through the pipe 138. A portion of this fluid is carried to the pump 139, through the pipe 141, through the pipe 152, inwardly of the valve assembly 190, thence out through the pipe 162, through the pipe 164, to the rearward chamber 192 of the piston chamber 55, exerting a force upon the piston 58 pushing it forward at a relatively rapid rate of speed. Another portion of the fluid flows from the pipe 138 through the pipe 145, through the pressure relief valve 146, which pressure relief valve is set at 300 pounds pressure, thence inwardly of the valve assembly 190, thence out through the pipe 153, through the pressure relief valve 154, which pressure relief valve is set at a 10 pound pressure, and out through the outlet pipe 144 back into the sump 135. Another portion of the fluid in the pipe 138 flows through the pipe 149 to within the valve assembly 190 and thence out through the pipe 164 and up into the rearward chamber 192 of the piston chamber 55, so as to apply pressure upon the piston 58 pressing it forward within the piston chamber 55.

During this rapid traverse forward operation the fluid in the forward chamber 191 is drained out through pipe 157 back to within the valve assembly 190, thence out through pipe 153, through the pressure relief valve 154, which pressure relief valve is set at 10 pounds pressure, thence out through the outlet pipe 144 back into the sump 135.

The cam roller 120 during this operation has moved along the upper contour of this cam assembly 118 until it falls down into position C, thus changing the relative position of the parts of the valve assembly 190, ready for the feed forward operation, which feed forward operation was described as the first operation herein.

In addition to the fluid system described above, we provide a pressure indicator 167 which is in communication with pipe 164 by means of the pipe 165. A valve 166 is provided upon the pipe 165 for controlling the flow of fluid to the pressure indicator 167.

The pressure relief valve 142 set at 1000 pounds pressure is provided for the purpose of limiting a maximum pressure applied upon the tub 42 being formed to the 1000 pounds provided therewith.

The volume of the pump 139 is controlled by the volume control 140 which by shifting the position of the centrifugal center of the pump controls the volume of the pump 139. So that a relatively stable flow of fluid is obtained by this pump 139, we provide the pressure valve 150, which also controls the pump 139 in accordance with the pressure exerted in pipes 141 and 151 by the pump 139. The outline of the complete operation of our machine is described as follows: Beginning at the neutral position at which the cam roller 120 is in position A, the tooling member 49 is positioned to the right away from the tooling member 39. The motor 27 is started by pressing the control 28, and the motor rotates the tooling members 39 and 49 and also drives the pumps 137 and 139. An un-formed tub is placed in position upon the platform 85 and the handle 125 is raised so as to start the reciprocating movement of the rotating tooling member 49. The cam roller 120 is thereby raised to position B on the cam assembly 118 and the reciprocating tooling member 59 moves forward at a rapid traverse forward speed until the cam roller 120 falls down into position C, which is the position set for the tooling member 49 to meet the tub 42, and the feed forward operation is instituted.

At the time, that the tooling member 49 meets the tub 42 and starts to press against the tub, the feed forward commences. The rotating tooling member 49 moves against the tub 42 and the tooling member 39 and exerts a pressure of 1000 pounds against the tub 42 so as to roll or form the tub 42 between the two rotating tooling members 39 and 49 in the shape outlined by their beading faces. At the same time that the tooling member 49 moves forward at the feed forward speed and pressure, the holding arm 68 swings over into position over the tub 42 and in the same swinging motion, the holding member 66 comes down upon the tub 42 and holds it in proper position while being rolled. As the holding arm 68 swings the elongated gear 74 turns, which operates the guide rollers 91 and 95 so as to properly align and hold tub 42 while being formed. As the tub 42 is being formed by the pressure of the rotating member 49 against the rotating tooling member 39, the rotation of the two tooling members 39 and 49 causes the tub to rotate upon the platform 85 and in this way the tub 42 is formed around the edge of the entire circumference of the tub. The set screw 183 of the delaying mechanism 181 is so set that the feed forward operation is continued until the entire circumference of the tub 42 has been properly pressed in form. When the tub has been completely formed, the cam roller which has moved from position C to position D during the rolling of the circumference of the tub and is held in position D until the tub has been completely rolled or formed, it falls down into position E which starts the rapid traverse reverse operation. During the rapid traverse reverse operation, the rotating tooling member 49 is reciprocated back and away from the tub 42 at a relatively rapid rate of speed so that the tub may be removed, and at the same time the holding arm 68 raises the holding member 66 and the holding arm 68, swings up out of position, thus permitting the formed tub 42 to be taken up off of the platform 85. At the same time that the holding arm 68 swings out of the way of the tub 42, the piston 70 turns, so as to rotate the elongated gear 74, the guide rollers 91 and 94 are retracted away from the tub 42 so that the tub 42 is entirely disengaged and may be freely lifted up off of the platform 85. Another tub to be formed is then placed in the same position on the platform 85 and the same process is repeated.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. A machine for forming the shape of an article, said machine comprising, in combination, a pair of mating rotatable tooling members for engaging and shaping said article, one of said tooling members being adapted to be reciprocated relative to the other said tooling member, supporting means for supporting said tooling members, hydraulic means for reciprocating said one of said tooling members toward and away from the other said tooling member, driving means for rotating said tooling members, fluid control means for regulating said hydraulic means, and connecting means connecting said fluid control means and said one of said tooling members for operating the fluid controlled means in accordance with the operating position of said one of said tooling members.

2. A machine for forming the shape of an article, said machine comprising, in combination, a pair of mating rotatable tooling members for engaging and shaping said article, supporting members for supporting said tooling members, one of said supporting members being adapted to be reciprocated relative to the other said supporting member so that one of said tooling members is moved into different spaced relationship with respect to the other said tooling member, hydraulic means for reciprocating said one of said supporting members, driving means for rotating said tooling members, a feed trip cam member mounted on said reciprocating supporting member, a guide member adapted to ride said cam member and to register the change in position of said cam member, a fluid control valve for controlling said hydraulic means, and connecting means between said ride member and the fluid control valve so that the hydraulic means is controlled by the movement of the feed trip cam member.

3. A machine for forming the shape of an article by rolling a portion of the article between rotating mating tooling members, wherein one of said tooling members is successively reciprocated relative to the other tooling member at a rapid traverse forward movement for bringing the reciprocated tooling member into operating position, at a feed forward movement for applying pressure to the article between the tooling member, and at a rapid traverse reverse movement for moving the reciprocated member out of operating position, comprising, in combination, a first rotating tooling member and a second rotating tooling member, said tooling members being adapted to engage and press said article between them, said second tooling member being adapted to be reciprocated relative to said first tooling member, a support member for supporting each of said tooling members, a piston member for reciprocating said second tooling member, a piston chamber enclosing said piston, a holding member for holding said article in position for forming, hydraulic means for moving said holding member in and out of operating position, pump means for supplying fluid to said piston chamber for actuating said piston and reciprocating the second tooling member and for supplying fluid to said hydraulic means for actuating said holding member, valve means for regulating the flow of said fluid, a feed trip cam member carried by the second tooling member so as to reciprocate with the said second tooling member, a guide member adapted to engage said feed trip cam member and to respond to the change of position of said feed trip cam member, connecting means between said guide member and said valve means so that the operation of said valve means is controlled by the movement of the guide member relative to the cam member, the arrangement of the second tooling member, the valve means, and the holding member being such that when the second tooling member is in one position the valve means causes the said second tooling member to be reciprocated at a rapid traverse forward movement and the holding member to move into operating position, when in another position the valve means causes the second tooling member to be reciprocated at a feed forward movement, and when in another position, the valve means causes the second tooling member to be reciprocated at rapid traverse reverse movement and the holding member to move out of operating position.

4. A machine for forming the shape of an article by rolling a portion of the article between rotating mating tooling members, one of said tooling members being reciprocated relative to the other tooling member by hydraulic means, comprising, in combination, a first tooling member, a supporting member for supporting said first tooling member, a base mounted on said supporting member for supporting the article being formed, a holding member adapted to engage said article during the forming operation to rise above, and swing away from, the said article between successive forming operations, a second tooling member adapted to mate with the first tooling member and to engage and form the article placed between them, a reciprocating supporting member for supporting said second tooling means, hydraulic means for reciprocating the said second tooling member and the said supporting member relative to the first tooling member and for operating said holding member, valve means for controlling said hydraulic means, control means carried by the reciprocating supporting member for regulating said valve means in accordance with the position of said reciprocating tooling member, and driving means for rotating said tooling members, the combination of the control means, the valve means, and the hydraulic means being such that when the control means is in one position the reciprocating tooling member is reciprocated at a rapid traverse forward speed up to the article being formed, that when the control means is in a second position the reciprocating tooling member is reciprocated at a relatively slow feed forward speed to apply pressure upon the article being formed and the holding member is moved into holding position over the said article, and that when the control means is in another position the reciprocating tooling member is reciprocated at a rapid traverse reverse speed away from the article and the holding member is moved up over, and swings away from, the said article.

5. A machine for forming the shape of an article by rolling the article between rotating mating tooling members, one of said tooling members being reciprocated relative to the other tooling member by hydraulic means, comprising, in combination, a first rotating tooling member adapted to engage said article, a supporting member for supporting said first tooling member, a base carried by said supporting member for supporting the said article, a guide roller reciprocally mounted on said base for engaging and guiding said article, a holding member for engaging and holding the article, hydraulic means for elevating and rotating said holding member in and out of holding position, gear means connecting said hydraulic means and said guide roller for moving said guide roller with the rotating movement of said holding member, a second rotating tooling member, a support member for supporting said second tooling member, hydraulic means for reciprocating said supporting member so that the second tooling member is reciprocated relative to the first tooling member, fluid control means responsive to the position of the reciprocating support member for controlling the hydraulic means reciprocating said supporting member and the hydraulic means elevating and rotating the holding member, and driving means for rotating said tooling members.

6. A machine for forming the shape of an article comprising, in combination, a pair of mating rotatable tooling members for engaging and shaping said article, one being reciprocably movable toward and away from the other, a supporting member for each of said tooling members, hydraulic means for reciprocating said movable tooling member toward and away from the other tooling member, holding means for holding the article being shaped, hydraulic means for operating said holding means, fluid control means responsive to the reciprocating movement of the reciprocably movable tooling member toward and away from the other tooling member, for controlling both said hydraulic means, and driving means for rotating said tooling members.

7. A machine for forming the shape of an article comprising, in combination, a pair of mating rotatable tooling members for engaging and shaping said article, a supporting member for each of said tooling members, one of said supporting members being non-movable and the other of said supporting members being reciprocably movable toward and away from the said non-movable supporting member, a holding member for engaging the top of said article, said holding member being mounted on the non-movable supporting member and being adapted to be rotated and moved vertically relative to the non-movable supporting member, a guide roller reciprocably mounted on said non-movable supporting member for guiding the horizontal movement of said article, the said guide roller being operatively connected to said holding member, hydraulic means for reciprocating the movable supporting member and for operating the holding member and the guide roller, fluid control means responsive to the reciprocating movement of the movable support member for controlling said hydraulic means, and driving means for rotating said mating rotatable tooling members.

8. In combination, a pair of rotatable mating tooling members for engaging and forming an article, one of said tooling members being reciprocably movable toward and away from the other, supporting means for supporting said tooling members, a device carried by said supporting members for holding the article being formed, said device including roller members for supporting said article, a holding member for holding said article down in operative position, a guide roller for horizontally guiding the article into operative position, and hydraulic means for operating said holding member and said guide roller, other hydraulic means for reciprocating the movable tooling member, driving means for rotating the said tooling members, and fluid control means for controlling the plurality of hydraulic means, the said fluid control means being responsive to the operating condition of said reciprocating tooling member.

9. The combination of a pair of rotatable mating tooling members for engaging and forming an article, one of said tooling members being reciprocably movable toward and away from the other, a supporting member for supporting the said tooling members, hydraulic means for supporting and for reciprocating said movable tooling member, driving means for rotating said tooling members, securing means for securing said article in forming positions, said securing means being mounted on said supporting member and being adapted to be moved into and out of securing position, hydraulic means for operating the said securing means, and fluid control means responsive to the operating condition of the movable tooling member for controlling and synchronizing the hydraulic means reciprocating the movable tooling member and the hydraulic means operating the said securing means.

10. A device for holding an article being formed between a pair of rotative mating tooling members mounted upon a frame, one of the tooling members being reciprocably movable toward and away from the other tooling member for exerting pressure upon the article so as to form said article and for releasing the article after being formed, comprising, in combination, a platform for accommodating said article, a plurality of roller members mounted on said platform for supporting said article and for permitting said article to rotate, a plurality of guide rollers reciprocably mounted on said platform for engaging and guiding said article into position for forming, said guide rollers having flange portions for supporting said article, a holding member for holding said article down in forming position, said holding member including an upright member carried by said frame, an arm member secured to said upright member, and an article engaging member secured to said arm member, the said holding member being adapted to be raised and lowered and rotated so that the said article may be placed in and out of forming position, connecting means between said upright member and said guide rolllers so that said guide rollers are reciprocated as said upright member is rotated, hydraulic means for operating said holding member, and fluid control means responsive to the movement of the movable tooling member for controlling said hydraulic means, the combination of the movable tooling member, the fluid control means, and the holding member being such that the holding member is lowered and rotated toward the said article when the movable tooling member is moved toward the other tooling member and being such that the holding member is raised and rotated away from the said article when the movable tooling member is moved away from the other tooling member.

11. A device for holding an article being formed by a rolling machine comprising, in combination, a plurality of roller members for supporting said article and for permitting said article to rotate during the forming operation, a guide member for guiding the horizontal movement of said article being formed, a holding member for controlling the vertical movement of said article, connecting means between said holding member and said guide member for operating said guide member with the operation of said holding member, supporting means for said roller members, said guide member, and said holding member, operating means for operating said holding member, and control means responsive to the operating condition of said rolling machine for controlling said operating means.

12. A machine for forming the shape of an article, said machine comprising, in combination, a pair of mating tooling members for engaging and shaping said article, supporting members for supporting said tooling members, one of said supporting members being adapted to be reciprocated relative to the other said supporting member so that one of said tooling members is moved into different spaced relationship with respect to the other said tooling member, hydraulic means for reciprocating said one of said supporting members, a feed trip cam member mounted on said reciprocating supporting member, a guide member adapted to ride said cam member and to register the change in position of said cam member, a fluid control valve for controlling said hydraulic means, and connecting means between said ride member and the fluid control valve so that the hydraulic means is controlled by the movement of the feed trip cam member.

13. A device for holding an article having portions being formed by a forming machine in which said article is rotated, said machine having fluid control means responsive to the operating position of said machine, comprising, in combination, a supporting member for supporting said article, a holding member adapted to engage said article and to hold it in operating position on said supporting member to permit rotation of said article, hydraulic means for moving said holding member toward and away from said article so that said article may be replaced on said supporting member, said hydraulic means being responsive to the said fluid control means, and means for supporting said supporting member and said holding member.

14. A device for holding an article being formed by a forming machine, said machine having fluid control means responsive to the operating position of said machine, comprising, in combination, a supporting member for supporting said article, rollers on said supporting member for permitting said article to move on said supporting member, guide members carried by said supporting member for engaging and guiding said article into operating position, a holding member for engaging and holding said article in operating position on said supporting member, hydraulic means for moving said holding member toward and away from said article so that said article may be replaced, means responsive to said hydraulic means for rotating said holding member toward and away from said article as said holding member is moved, said hydraulic means being responsive to said fluid control means, and means for supporting said device on said machine.

15. A device for holding an article being formed by mating rotatable tooling members of a forming machine, said machine being operable by hydraulic means responsive to fluid control means controlled by the operating position of said machine, comprising, in combination, a platform carried by said machine, rollers carried by said platform for supporting said article and for permitting said article to rotate as it is being formed, rotative guide members carried by said platform for guiding and directing the movement of said article being formed, a holding member carried by said machine for holding said article down in forming position between said tooling members, hydraulic means responsive to the said fluid control means of the machine for vertically moving said holding member, and means responsive to the vertical movement of the holding member for rotating said holding member, the arrangement of the holding member, the hydraulic means for vertically moving the holding member, and the means for rotating the holding member being such that the holding member is rotated toward and moved down upon the said article to hold the article during the forming operation and is rotated away from and moved up from the said article after completion of the forming operation.

JOSEPH D. KREIS.
ELSMERE W. McKINNEY.